US011168564B2

(12) United States Patent
Lundh et al.

(10) Patent No.: US 11,168,564 B2
(45) Date of Patent: Nov. 9, 2021

(54) METHOD AND SYSTEM FOR ASSIGNING TASKS TO MINING AND/OR CONSTRUCTION MACHINES (71) Applicant: EPIROC ROCK DRILLS AKTIEBOLAG, Orebro (SE)

(72) Inventors: Robert Lundh, Orebro (SE); Stephen Joyce, Ervalla (SE); Masoumeh Mansouri, Orebro (SE); Henrik Andreasson, Orebro (SE); Federico Pecora, Orebro (SE)

(73) Assignee: EPIROC ROCK DRILLS AKTIEBOLAG, Örebro (SE)

( * ) Notice: Subject to any disclaimer, the term of this patent is extended or adjusted under 35 U.S.C. 154(b) by 602 days.

(21) Appl. No.: 15/764,759

(22) PCT Filed: Sep. 29, 2016

(86) PCT No.: PCT/SE2016/050923
§ 371 (c)(1),
(2) Date: Mar. 29, 2018

(87) PCT Pub. No.: WO2017/058088
PCT Pub. Date: Apr. 6, 2017

(65) Prior Publication Data
US 2018/0266247 A1 Sep. 20, 2018

(30) Foreign Application Priority Data
Oct. 1, 2015 (SE) .................................... 1551256-9

(51) Int. Cl.
*G05D 1/02* (2020.01)
*G06F 9/48* (2006.01)
(Continued)

(52) U.S. Cl.
CPC .............. *E21C 41/26* (2013.01); *E21C 41/00* (2013.01); *G05D 1/0297* (2013.01);
(Continued)

(58) Field of Classification Search
CPC .............................. G06F 9/4881; G06Q 50/02
See application file for complete search history.

(56) References Cited

U.S. PATENT DOCUMENTS 4,679,489 A  7/1987  Jasinski et al.
6,484,078 B1  11/2002  Kageyama
(Continued)

FOREIGN PATENT DOCUMENTS

WO  2010118470 A1  10/2010
WO  2010129419 A2  11/2010
(Continued)

OTHER PUBLICATIONS

International Search Report and Written Opinion for International Application No. PCT/SE2016/050923 dated Dec. 19, 2016.
(Continued)

*Primary Examiner* — Peter D Nolan
*Assistant Examiner* — Ce Li Li
(74) *Attorney, Agent, or Firm* — Jeffri A. Kaminski; Venable LLP (57) ABSTRACT A method for assigning a set of tasks to a plurality of mining machines, said machines being arranged to be driven between positions for performing tasks is provided. The method includes defining a first set of constraints to be fulfilled finding an overall solution fulfilling the first set of constraints by solving each constraint as a sub-problem, a solution to at least one sub-problem being dependent on the solution of at least one other sub-problem; the overall solution fulfilling the first set of constraints being an overall solution where a first of said sub-problems is validated by
(Continued)

solutions of others of the sub-problems, and assigning tasks to the machines according to the determined validated overall solution, wherein tasks are arranged to be carried out at least partially overlapping in time by the mining machines.

27 Claims, 6 Drawing Sheets

(51) Int. Cl.
    *E21C 41/26*     (2006.01)
    *E21C 41/00*     (2006.01)
    *G06Q 50/02*     (2012.01)
    *G06Q 10/04*     (2012.01)
    *G06Q 10/10*     (2012.01)
    *G06Q 10/06*     (2012.01)
    *E21C 41/16*     (2006.01)

(52) U.S. Cl.
    CPC ........... *G06F 9/4881* (2013.01); *G06Q 10/04* (2013.01); *G06Q 10/06311* (2013.01); *G06Q 10/1097* (2013.01); *G06Q 50/02* (2013.01); *E21C 41/16* (2013.01); *G05D 2201/021* (2013.01); *G05D 2201/0202* (2013.01)

(56) References Cited

U.S. PATENT DOCUMENTS

| | | | |
|---|---|---|---|
| 8,261,855 B2 | 9/2012 | Stacy, II et al. | |
| 8,364,189 B2 | 1/2013 | Mintah et al. | |
| 8,612,084 B2 | 12/2013 | Hennessy et al. | |
| 8,733,473 B2 | 5/2014 | Nadeau et al. | |
| 2005/0209912 A1* | 9/2005 | Veeningen | G06Q 10/06 705/7.12 |
| 2007/0027612 A1* | 2/2007 | Barfoot | G05D 1/024 701/117 |
| 2007/0271002 A1 | 11/2007 | Hoskinson et al. | |
| 2009/0118889 A1* | 5/2009 | Heino | B62D 12/02 701/24 |
| 2012/0024605 A1* | 2/2012 | Elinas | G06Q 10/06 175/57 |
| 2012/0044043 A1 | 2/2012 | Nettleton et al. | |
| 2012/0179322 A1* | 7/2012 | Hennessy | G05D 1/0278 701/25 |
| 2014/0083767 A1 | 3/2014 | McHugh et al. | |
| 2015/0286611 A1* | 10/2015 | Moll | G06F 17/11 708/102 |

FOREIGN PATENT DOCUMENTS

| | | |
|---|---|---|
| WO | 2011032208 A1 | 3/2011 |
| WO | 2012141601 A2 | 10/2012 |
| WO | 2014131080 A8 | 3/2015 |

OTHER PUBLICATIONS

Andreasson et al, "Autonomous Transport Vehicles: Where We Are and What Is Missing", IEEE Robotics & Automation Magazine, vol. 22, p. 64-75, Mar. 13, 2015, doi: 10.1109/MRA.2014.2381357, ISSN: 1070-9932; whole document.

Dechter, Rina "Temporal Constraint Networks" Artifical Intelligence, 49 (1991) pp. 61-95.

\* cited by examiner

METHOD AND SYSTEM FOR ASSIGNING TASKS TO MINING AND/OR CONSTRUCTION MACHINES

CROSS-REFERENCES TO RELATED APPLICATIONS

This application is a U.S. National Stage application of PCT/SE2016/050923, filed Sep. 29, 2016 and published on Apr. 6, 2017 as WO/2017/058088, which claims the benefit of Swedish Patent Application No. 1551256-9, filed Oct. 1, 2015, all of which are hereby incorporated by reference in their entireties.

FIELD OF THE INVENTION

The present invention relates to operation of mining and/or construction machines, and in particular to a method for assigning tasks to mining and/or construction machines according to the preamble of claim 1. The invention also relates to a system and a mining and/or construction machine.

BACKGROUND OF THE INVENTION

In mining and tunneling, for example, there is a constant ongoing process of improving efficiency, productivity and safety. Examples of changes/improvements that are carried out to an increasing extent, perhaps in particular in mining, is the automation, fully or partly, of various processes occurring in mining.

It is, for example, often desirable that at least part of the vehicles/machines that are used in mining/tunneling can be driven fully autonomous, i.e. without an operator being required to influence the control/operation. In fact, the operation of autonomous vehicles/machines are more and more becoming key components in mining and construction. Methods for localization, mapping, control and motion planning have enabled development and deployment of autonomous vehicles.

SUMMARY OF THE INVENTION

It is an object of the present invention to provide a method for assigning tasks to mining and/or construction machines. This object is achieved by means of a method according to claim 1.

The present invention relates to a method for assigning a set of tasks to a plurality of mining and/or construction machines, said machines being arranged to be driven between positions for performing tasks. The method includes:
 defining a first set of constraints to be fulfilled when assigning said tasks to said plurality of mining and/or construction machines;
 finding an overall solution fulfilling said first set of constraints by solving each constraint as a sub-problem, the solution to at least one sub-problem being dependent on the solution of at least one other sub-problem;
 said overall solution fulfilling said first set of constraints being an overall solution where a first of said sub-problems is validated by solutions of others of said sub-problems, and
 assigning tasks to said plurality of machines according to the determined validated solution, wherein tasks of said set of tasks are arranged to be carried out at least partially overlapping in time by said plurality of mining and/or construction machines.

The present invention, consequently, provides a method for assigning tasks to plurality of machines. These machines can be manually operated machines or autonomous machines. When the machine is working autonomously, the assigned tasks can be dispatched, communicated, to the machine, which then carries out the tasks. It is also contemplated that the machine is a manually operated machine, in which case the tasks can still be determined according to the invention and communicated to the machine, where the tasks can then be displayed to an operator when performing the tasks using the machine and guide the operator to maneuver the machine in a manner fulfilling the constraints.

Hence, the assigning of tasks according to the invention is arranged to assign said tasks to a plurality of mining and/or construction machines, which can be autonomous machines or manually operated machines, or a combination thereof. Furthermore, the machines may be arranged to be autonomously driven between positions for performing tasks. Tasks of said set of tasks are arranged to be carried out at least partially overlapping in time by a plurality mining and/or construction machines. That is, machines can be carrying out different tasks of said set of tasks concurrently.

With regard to mining and construction, there are important hindrances when it comes to employing a plurality of autonomous vehicles simultaneously. Fleet automation, i.e. the operation of a plurality of machines simultaneously, often involves solving several, strongly correlated sub-problems such as allocating tasks to vehicles, planning vehicle motions, and vehicle coordination. This makes solving the overall problem of assigning tasks difficult. The invention provides a solution to solving such problems. According to the present invention, it is provided a method where a solution to a problem of assigning tasks to autonomously operating machines is obtained, where the number of tasks to be performed can be large, e.g. in the order of 30 or more, and where the solution can accommodate one or multiple machines and tasks can be performed at least partially concurrently.

The assigning of said set of tasks can therefore be solved as a higher level constraint satisfaction problem, a solution to the problem of assigning said set of tasks being searched from solutions to said sub-problems, each of said sub-problems being solved as a lower level constraint satisfaction problem providing a solution to constraints of the higher level constraint satisfaction problem.

According to the provided solution, the problem of assigning tasks is stated as a set of tasks to be assigned to the machines given a set of constraints with regard to the assigning and carrying out of the tasks. That is, a set of requirements that must be fulfilled when the tasks are carried out. These requirements, in turn, are arranged to form sub-problems, which are solved sub-problem by sub-problem, but where sub-problems depend on each other, so that a solution of one sub-problem will be dependent on the solution of another sub-problem. According to the invention, this is accounted for when searching an overall solution from the solutions of sub-problems by requiring a first sub-problem to be validated by solutions to other sub-problems.

The solution to the assigning of said tasks is found by validating a solution to one of said sub-problems by solutions of the others of said sub-problems. That is, the solution to a sub-problem is considered a valid solution, if the solution allows solutions also of the other sub-problems that fulfill the given constraints. Consequently it is ensured that a sub-solution is such that it does not prevent other sub-problems from being solved.

If a solution to a first sub-problem is not validated by solutions to other sub-problems the solution to the first sub-problem is discarded and another solution to the first sub-problem be searched and be validated by solutions to other sub-problems. This can be iterated until a solution has been found that fulfills all sub-problems.

A common representation of the sub-problems can be used, where said tasks are represented by variables. In this way, solver algorithms of the sub-problems share a common search space when searching a solution to a sub-problem so that the solution to a sub-problem can be validated by solutions to other sub-problems in an efficient manner.

The use of constraints substantially reduces allowable solutions, with the result that much less computational power is required to solve the overall problem of assigning tasks.

Consequently, according to the invention, the overall problem is divided into a plurality of sub-problems and the mutually feasible solutions to the individual sub-problems are found, where solutions from different sub-problems are combined.

Furthermore, a heuristically guided backtracking search can be used to find a solution to the overall problem in the joint search spaces of the sub-problems.

Priorities can be assigned to said sub-problems, so that a solution to the assigning of said tasks can be determined by validating a solution to a higher prioritized sub-problem by solutions to lower prioritized solutions. In this way, it can be ensured that sub-problems that depend on the existence of a solution of another sub-problem are solved after such solution exists.

When solving the assignment of tasks, a representation of the tasks to be carried out by means of said machines can be used. For example, the representation may include positions at which the tasks are to be carried out, and also data regarding what the task consists of. A representation of said machines can also be used when solving the assignment, where the representation of the machines may include a representation of speed and capacity, e.g. in the form of drilling or loading.

The tasks can be arranged to be carried out within a border confining a geographical area, where the machines are not allowed to cross the border.

According to one embodiment it is determined start times and end times for performing each of said tasks, the start times and end times of a task being defined in relation to start times and end times of the other of said tasks, and said assignment of said tasks including a start time and end time for performing said tasks. In this way, machines can be scheduled to perform tasks such that they do not collide when operating in overlapping geographical areas.

Hence, a plurality of machines can simultaneously perform different tasks of the set of tasks, where the machines, when carrying out the tasks, may be present at a same location but scheduled to be at the same location at different times so that they do not collide.

During operation, i.e. when actively performing said tasks, progress data regarding fulfillment of said tasks can be transmitted from said machines, and start times and end times of the tasks can be recalculated on the basis of received progress data, so that it can be accounted for e.g. tasks taking shorter or longer periods of time to carry out than expected.

Furthermore, an estimated time of completion and/or time to completion of said set of tasks can be determined, and displaying said estimated time of completion and/or time to completion. In this way, other work, such as other kinds of tasks, to be carried out after the tasks have been completed, e.g. by means of other machines can be scheduled in a cost-effective manner.

The estimated time of completion and/or time to completion of said tasks can be updated on the basis of progress data received from said machines when carrying out said tasks. In this way, a proper estimate can always be obtained, e.g. if the performance of the tasks takes longer than expected.

The problem of assigning tasks to said machines can be arranged to be re-determined when work is ongoing e.g. if machines communicate deviations requiring a re-assignment of said tasks. For example, a machine may suffer a break down, or tasks may take longer than expected to carry out so that tasks must be reassigned to other machines. Occurrences of this kind can be accounted for by re-determining the assignment of tasks in view of the changed conditions, so that the ongoing carrying out the tasks can be continued, however with changes in the assignment of tasks to machines.

The assigning of said tasks can further include a constraint such that, when said machine has finished assigned tasks, a defined end position can be reached by a machine without violating allowed movements within the area in which said tasks are being carried out. In this way it can be ensured that the machine can be moved away from the work area, e.g. if blasting is to be performed, without destroying work performed by tasks that has been carried out.

The assignment of said tasks can be performed from a location remote from at least one of said machines, e.g. from one of the machines, or from a control center being separate from all of the machines.

The method of finding a solution to the assigning of tasks to the plurality of mining and/or construction machines according to the invention can be arranged to be carried out by calculating/computing means, such as a computer or control unit e.g. in a control center or other remote location in relation to the mining and/or construction machines. According to embodiments of the invention, calculating/computing means are included in one or more of the mining and/or construction machines. For example, the method can be controlled by one mining and/or construction machine instructing the one or more other mining and/or construction machines participating in the task at hand.

The invention also relates to a system and a mining and/or construction machine.

DETAILED DESCRIPTION OF A PREFERRED EMBODIMENT

Embodiments of the invention will be exemplified with reference to a specific problem in a mining application. The invention is, however, applicable in various other mining applications as well. Also, as explained above, the invention is applicable also when only one machine is present, and when the one or more machines are manually operated.

However, according to the example discussed in the following, a fleet of, i.e. a plurality of, surface drill rigs are arranged to operate autonomously and concurrently within a shared area of the open-pit mine, called a bench. Rock/ore excavation in mines of this kind often involves drilling of a set of drill targets in the bench. That is, at each predetermined target (position) a blast hole is to be drilled. The blast holes are then filled with explosive material that is detonated after all targets have been drilled. After the explosion, the ore is taken away and processed for mineral extraction.

Figure 1:
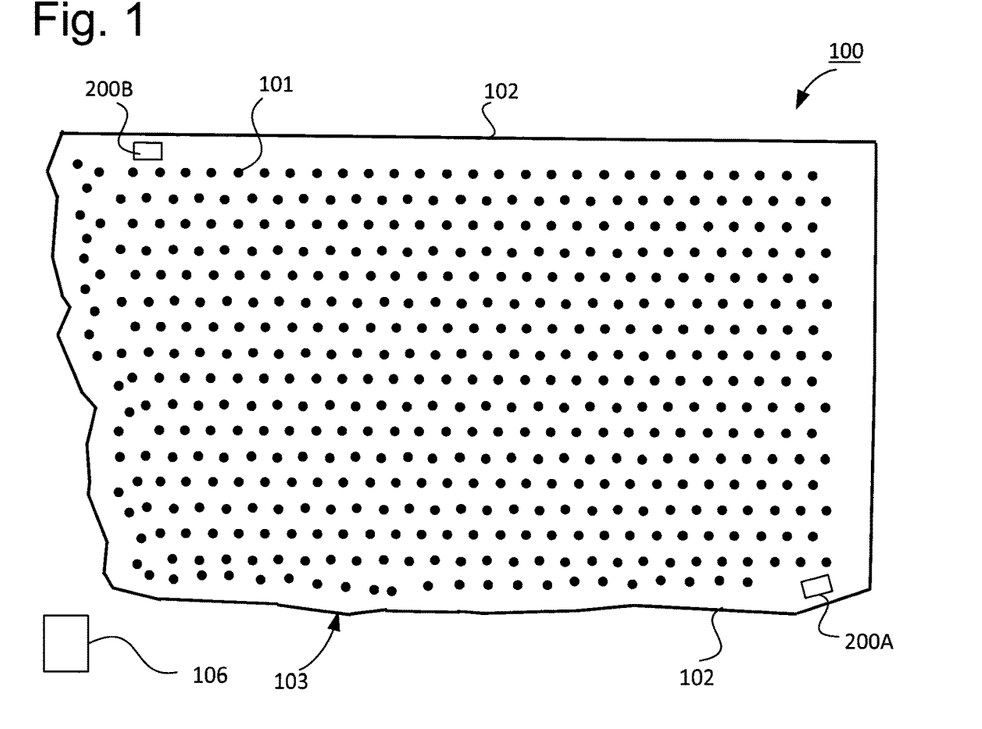
FIG. 1 shows a surface pit-mine drill plan and geofence restricting machine movements.

An example of a bench 100 is shown in FIG. 1, where a plurality of holes (drill targets), indicated by a large number of black dots 101, are to be drilled for subsequent blasting. The geographical area making up the bench 100 is outlined and defined by an outer boundary 102, which, as will be explained below, indicates a geographical area to which the machines are confined and must not traverse in order to avoid accidents and/or collisions with surrounding obstacles such as rock. The boundary 101 thus constitutes a geofence.

Each drill target 101 can be seen as a task to be carried out, where a machine (drill rig) autonomously carries out a set of sub-tasks when completing the task of drilling the hole. These sub-tasks may e.g. include auto-tramming (automatically navigating) to the target (drill position) from its current position, leveling the drill rig (deploying jacks for leveling the machine in position for drilling, e.g. horizontally), drilling, de-leveling (retracting the jacks so the machine is placed back on its tracks) and moving away from the drilled hole. FIG. 1 further shows two drill rigs 200A, 200B which are to be used to drill the bench 100, and a control center 106 in which e.g. calculation according to the invention can be arranged to be carried out.

Figure 2:
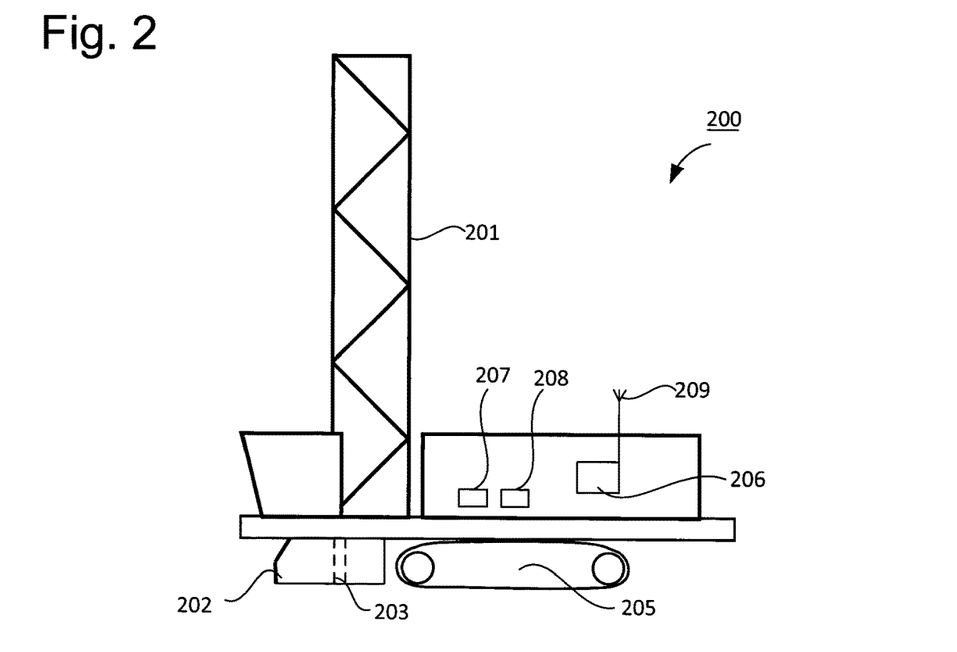
FIG. 2 shows a drill rig which can be utilized according to the invention.

FIG. 2 discloses an exemplary side view of a drill rig 200 which may be utilized in a solution according to embodiments of the invention for drilling holes of a bench according to FIG. 1. The drill rig 200 is only exemplary, and there exist various kinds of drill rigs of various designs that can be used according to the invention. The drill rig 200 constitutes a surface drill rig being used to drill vertical or substantially vertical holes using a drill tool attached to a drilling machine via a drill string. The drilling machine is slidably arranged along a feed beam. These elements are conventional and not explicitly disclosed. Instead they are represented by a drill tower 201 and a schematically indicated drill string 203 indicating ongoing drilling. The general technology used when drilling using a machine according to FIG. 2 is well known per se. Drill rigs may also comprise a dust guard 202. Drill rigs may be provided with a dust guard or other kinds of means which to be positioned around the drill bit during drilling to reduce dust from unnecessary spreading to ambient air and surrounding ground during drilling.

The drill rig 200 also comprises crawlers or wheels 205 to allow the drill rig 200 to be moved from one position to another, such as from hole to hole to be drilled.

The drill rig 200 further comprises a control system comprising at least one control unit 206, which controls various of the functions of the drill rig 200 and in particular operation of the drill rig according to embodiments of the invention, where the control unit can be arranged to control crawlers, drilling machine etc. by suitable control of various actuators/motors/pumps 207, 208 etc. Drill rigs of the disclosed kind can comprise more than one control unit, where each control unit, respectively, can be arranged to be responsible for different functions of the machine. The control system of the drill rig 200 further comprises transceiver means 209 for receiving instructions regarding tasks to be performed and controls crawlers, beam, drilling machine etc. to carry out the received instructions, and to allow data to be transmitted from the drill rig e.g. to a control center, the data e.g. including current work data such as position, current progress when drilling a hole, completion of a task etc.

The present invention provides a solution that can be utilized to use a plurality of autonomous drill rigs for automatically and simultaneously performing e.g. drilling of holes according to a bench 100 according to FIG. 1, where drill rigs may be maneuvered within overlapping portions of the bench 100 while simultaneously being confined to stay within the geofence 102.

Such autonomous drilling gives rise to a number of problems to be solved. As drilling across the bench 100 progress, piles of drill cuttings will be accumulated at each location where a hole has already been drilled, and hence a drill rig need not only take the immediately drilled hole into consideration, but the drill rig must also avoid piles that have accumulated during previously drilled holes. The distance between holes may e.g. be in the order of 0.5-2 times the machine length, which, as drilling progress, may render maneuvering complicated to avoid piles from previously drilled holes while simultaneously staying within the geofence. Also, drilling must be performed such that the machine when the drilling of the holes of the bench 100 is finished, is not "locked in" by piles of already drilled holes, but is able to move away from the bench, or to a particular position within the bench, prior to blasting.

A bench may comprise a relatively large number of holes to be drilled, e.g. in the order of 30-2000. Since drilling of a single hole inherently takes some time use of a plurality (i.e. at least two) of concurrently operating drill rigs may considerably reduce overall time for completing drilling of the bench so that blasting can be performed at an earlier point in time. This imposes additional aspects that must be attended to when performing autonomous drilling using a plurality of machines. For example, it must be ensured that drilled holes by one machine do not prevent drilling of holes for the one or more other machines. Also, it must be ensured that drilling performed by one machine does not hinder drilling of holes for another machine. In addition it must be ensured that the machines do not collide with each other, i.e. are not present at the same location at the same time.

The automation of the operation of the fleet of autonomous operating machines involves solving of a plurality of problems that are strongly correlated. This makes solving the overall problem difficult, since a large number of solutions exist for each problem, thereby rendering it difficult from a computational point of view to find a common solution that solves all problems in a manner that also fulfills the further criteria, constraints, that usually must be met to obtain a working solution. Obviously, there are a huge amount of theoretical possibilities that can be evaluated in order to find a solution that works, thereby requiring large amounts of computational power. For example, in addition to the large number of holes to be drilled, these may be drilled from various directions with respect to a reference direction, different holes can be drilled by different machines etc. This renders solving of the problem complex. As will be explained below, it is preferred if changes to a determined way of assigning drilling of the holes to the various machines can be carried out underway as drilling progress.

According to the present invention, constraint satisfaction problem (CSP) solution is utilized to facilitate problem solving. CSP is well known per se and therefore not described in detail. The invention utilizes a two level CSP methodology that results in an efficient way of solving problems involving assignment of tasks to a plurality of autonomously operating machines that operate in overlapping portions of a geographical area.

The Drill Pattern Planning Problem of drilling the bench 100 of FIG. 1 (denoted DP3 in the following) consists of computing a drill plan that involves machines (drill rigs) reaching each drill target in the bench 100 and performing the necessary operations to drill the blast holes. The problem of assigning the drilling of the holes to a plurality of machines may be subject to the following requirements:

Machines should not collide with obstacles/each other when moving from one target to another;

Drill piles resulting from drilling constitute obstacles that must not be run over by dust guard or other machines;

Once drilling has been performed, the machine is limited in choice of movement when moving away from the drilled hole. According to the present example, the machine can only drive away from the target by backing after raising the forward dust guard 202a since this is the only part of the dust guard that can be actuated according to the present example);

Motions should be executable by the machines i.e., motions should be kinematically feasible. Hence, the planned motions of the machine must be able to be carried out in reality;

It should be possible to modify the resulting solution once drilling has started to account for events that occur once drilling has commenced;

The plan should respect spatial constraints with regard to possible movement of the machines. For example, a geofence according to the above must oftentimes be defined and within which the vehicles must operate to avoid collisions with e.g. surrounding rock or other obstacles or driving over edges.

Figure 3:
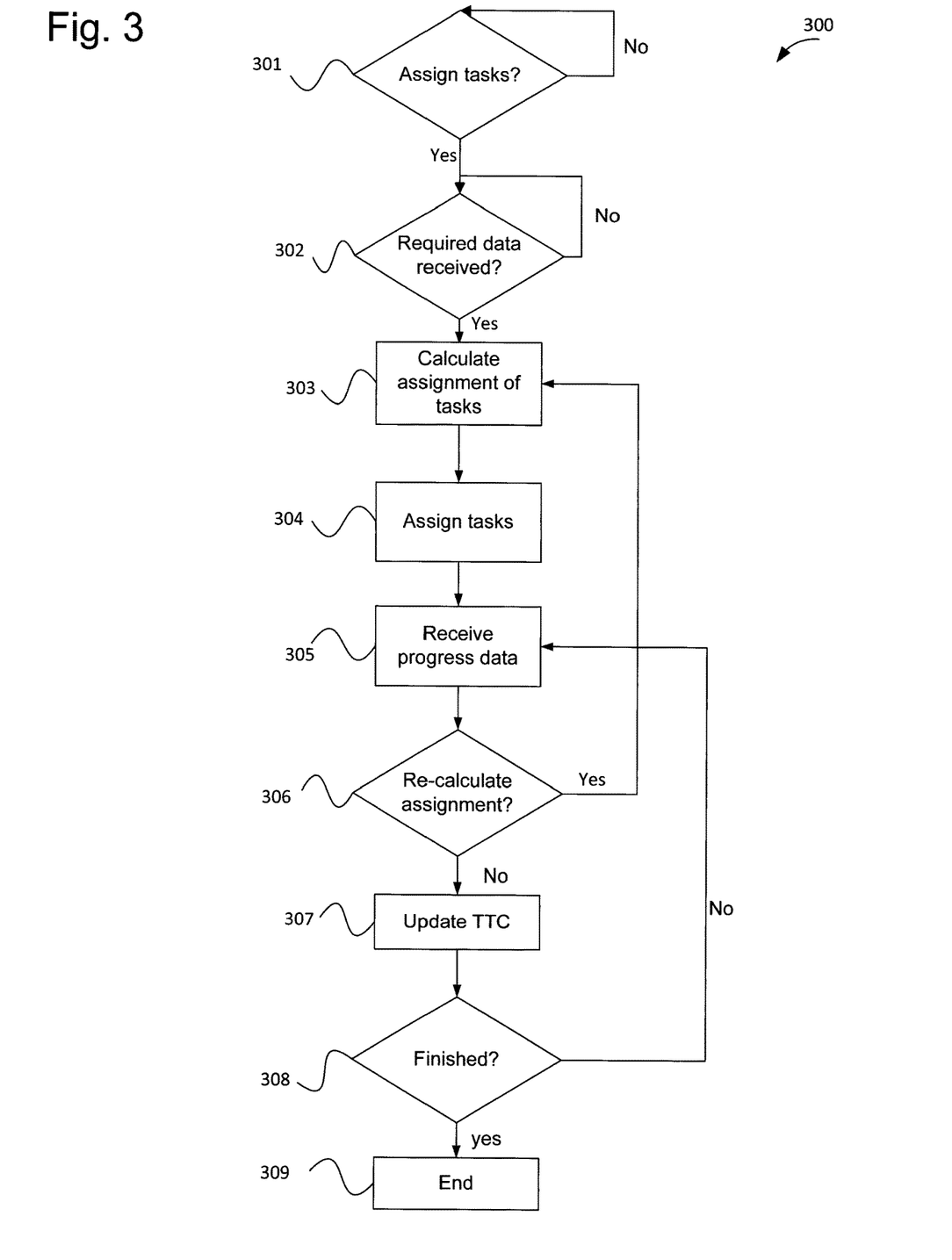
FIG. 3 shows an exemplary method according to embodiments of the invention.

An exemplary method 300 according to the invention is disclosed in FIG. 3. The method can be arranged to be carried out by calculating/computing means, such as a computer or control unit e.g. in a control center 106 or other remote location in relation to the drill rigs being utilized for drilling the bench. According to embodiments of the invention, means, such as calculating/computing means, are included in one or more of the drilling rigs 200A, 200B. For example, the method can be controlled by one drilling rig instructing the one or more other drilling rigs participating in the task at hand.

The method of FIG. 3 starts in step 301, where it is determined whether a drill plan problem consisting of assigning tasks to autonomously operating machines, in this example drill rigs 200A, 200B is to be carried out. When this is the case the method continues to step 302. In step 302 it is determined if required data to assign the tasks have been received. For example, with regard to the present embodiment, this data comprises the locations of the drill targets, i.e. the positions of the holes 101 to be drilled, and the geofence 102 defining the bench 100. The drill targets and geofence are oftentimes based e.g. on a geological survey of the area and on the current production plans of the mine. This data is input into the system prior to solving the drill plan problem DP3. Also other restrictions and heuristics may be input.

The set of machines to be used for accomplishing the task of drilling the holes, in the present example drill rigs 200A, 200B, are also determined beforehand, and in general selected on the basis of the problem at hand, where the size of a fleet of drill rigs to be used can be based e.g. on the size of the bench to be drilled. Also, different kind of machines may be required if holes of different diameters are to be drilled according to the drill plan. The number of and/or types of machines being available for the task at hand are input to the system. Further input may include initial positions of all machines, i.e. their current location or user defined starting positions, as well as desired final "parking" positions of the machines, e.g. in terms of an allowed area or position at which a machine is to be located once the drilling of the bench is completed.

When it is determined that required data has been received the assignment of tasks when drilling the drill plan is calculated in step 303, including time to completion estimation, according to the below. Steps 300-303 can be performed offline to compare different scenarios, e.g., different number of machines. In step 304 tasks are dispatched, i.e. communicated to machines. In step 305 progress data is received regarding the completion of the tasks, and in 306 it is determined whether a recalculation of the solution is to be performed. If so the method returns to step 303 for recalculation. In step 307 the time to completion of all tasks is updated, e.g. based on tasks taking longer than expected etc. as explained above and below. Also, time windows for performing tasks can be updated on the basis of actual progress of performing the tasks. In step 308 it is determined if the tasks have been carried out, and if so, the method is ended in step 309. If not, the method returns to step 305.

The calculation in step 303 is carried out according to the following. The requirements set out above regarding the drill plan problem DP3 pose several problems e.g., task allocation (of machines to target poses), motion planning, and coordination. These problems cannot be treated separately and independent from each other, since the solutions of each problem depend on each other. For instance, coordination must lead to a sequence of target poses that accounts for the piles generated after drilling (which become obstacles that must be taken into account in motion planning).

Hence, it is necessary to subject the possible choices made to solve one problem to the choices made in resolving the other problems, e.g., verifying through motion planning that a chosen sequence of targets to drill will be kinematically feasible in reality. Because of these interdependencies, the drill plan problem is a hybrid reasoning problem. According to the invention, an approach is utilized in which the overall problem (e.g. drilling the holes of FIG. 1) is divided into sub-problems, and the solution to the overall problem is searched for in the joint search space of these sub-problems.

The drill plan problem according to the present example can be divided into five sub-problems.

A sequencing sub-problem. This sub-problem consists of deciding a total ordering of targets i.e., sequencing every pair of targets so that it is determined in which order targets (holes) are to be drilled.

A motion planning sub-problem. This sub-problem consists of deciding the pose, alignment, of the drilling machines at each target. That is, it is determined the alignment of the machine in relation to e.g. a reference direction for each hole to be drilled and also the space required and traversed when moving from one hole to another. The alignment should be such that the holes can be drilled without disturbing piles of already drilled holes, and also ensure that the machine can move away from the drilled hole. Constraints on the orientation of the machine in certain target poses may be given (e.g., due to the presence of the geofence or other geographical constraints like cliffs and walls present within the area to be drilled. The decisions are subject to kinematic constraints, obstacles and geofence, and must account for piles resulting from drilling, as well as the dust guard mechanism.

A machine allocation sub-problem. This problem consists of allocating machines to targets given the available machines and their positions. Machine allocation also accounts for the need to reach a given end parking position.

A coordination sub-problem. This sub-problem consists of scheduling machines. Solutions to this sub-problem consider spatio temporal overlap between machines, i.e. machines may traverse a same geographical point at the same or different points in time. The sub-problem also consider overlap between machines and piles, i.e. it must be ensured that piles generated by one machine are not run-over by other machines.

A temporal sub-problem consists of deciding when machines should carry out motion, drilling, leveling and de-leveling operations, subject to temporal constraints arising from coordination, sequencing, maximum achievable speeds, etc.

According to present example, Constraint Satisfaction Problem (CSP) solving is used to obtain a solution to the posed drill plan problem. CSP is well known per se, and hence the actual realization of the solving of the sub-problems when criteria are set can be performed in a conventional manner. A solution to the overall problem is obtained by reasoning upon these five different sub-problems jointly. Candidate solutions for a sub-problem are validated by dedicated solvers. Each solver focuses on a subset of aspects of the overall problem, e.g., a motion planner verifies kinematic feasibility and absence of collisions, while a temporal solver verifies that coordination choices are temporally feasible. Validated solutions for each sub-problem can be seen as constraints that account for particular aspects of the overall problem. They can be maintained in a common representation, which is sufficiently expressive to model the search space of all sub-problems jointly. The common representation can constitute a constraint network where variables represent tasks.

According to the present example, a task is represented by a tuple M=(gp,sp,r,P,m,S,T,A), where r represents the machine (drill rig) which should perform the set of activities A={drilling, leveling, de-leveling} at, respectively, starting pose sp and goal pose gp.

P is the path that r traverses to reach gp from sp, and is computed based on a map m of the environment (bench and drill holes).

S is a set of polygons representing sweeps of the machine's footprint over P when moving from sp to gp, and T is a set of time intervals representing when r will be in each polygon contained in S. The time intervals can e.g. be absolute time intervals, or time intervals with reference to a start time at which the drill rigs begin drilling the drill plan.

Henceforth, M(•) denotes an element of the task tuple.

Let M be the set of all tasks in the overall problem at hand (one for each drill target). A solution to the overall problem is such that a value is decided for all elements of a task, for each task in M∈M. Each element is decided by solving one or more sub-problems.

Consequently, a task M can be viewed as a variable in a Constraint Satisfaction Problem whose domain represents all possible combinations of values that can be given to each element of M. Accordingly, a sub-problem can be viewed as the problem of constraining the domains of tasks so the requirements stated above are met. Hence, the solvers that validate solutions to the sub-problems are seen as procedures that post constraints to the common constraint network. As will be explained, adopting the CSP metaphor allows employment of heuristic search strategies for solving the overall problem.

The sub-problems listed above will be discussed in the following.

Sequencing Sub-Problem

Figure 4A:
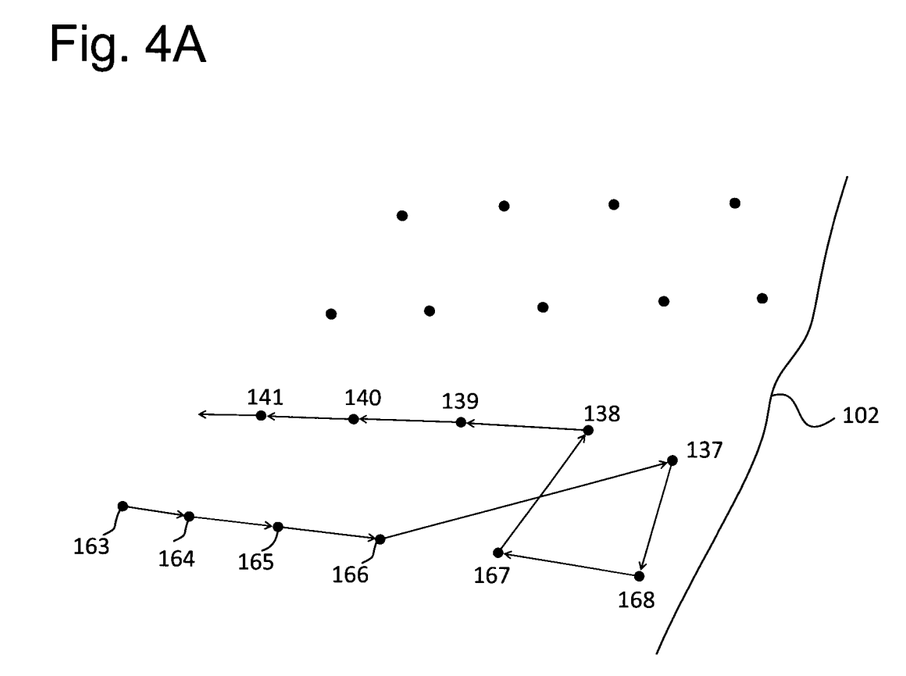
FIG. 4A shows an example of decisions in a sequencing of tasks sub-problem according to embodiments of the invention.

The sequencing sub-problem consists of finding a total order of the tasks to be performed. A decision variable of this sub-problem is a task $M_i \in M$ that does not have a preceding task. A possible value that can be assigned to this decision variable is a precedence constraint $M_j$ precedes $M_i$, asserting that task $M_j \in M$ should occur before $M_i$. $M_j$ is a task for which it has not been already decided that it precedes another task. A sequencing solver verifies that tasks are totally ordered. FIG. 4A shows an example of decisions in this sub-problem. FIG. 4A discloses a portion of the bench of FIG. 1 near the geofence 102 where the machine has to perform a turn. As can be seen the order of drilling the holes closest to the geofence is changed from the pattern before (consecutive) and after (also consecutive) the turn at the geofence. In particular, the order is 166→137→168→167→138→139 etc. The actual track of machine movement when performing the drilling close to the geofence may be relatively complicated, as will be seen below, in relation to the drilling of holes along a straight line, where movement pattern is straight forward (e.g. along a straight line).

Motion Planning Sub-Problem

The motion planning sub-problem consists of finding a goal pose gp for each task $M_i \in M$. A gp is a tuple $\langle x,y,\theta \rangle$ in which x and y represent the (geographical) position of a drill target on the bench, and $\theta$ is the orientation of the machine in relation e.g. to a reference direction. The decision variables of the motion planning sub-problem are tasks $M_i$ such that:

(1) $M_i(gp)$ does not have a defined orientation, i.e., $\theta$ is not assigned to an angle, (2) there exists $M_j$ precedes $M_i$ in the common constraint network, and (3) $M_j(gp)$ has been assigned an orientation.

The number of possible values that can be assigned to a decision variable can be any suitable number of angles, where a limited set of angles can be used e.g. improve computational efficiency. According to the present example, a set of eight angles $\{\theta_1,\ldots,\theta_8\} \in [0,2\pi]$ are used, which can be evenly distributed over a full rotation $[0,2\pi]$. A particular choice of approach angle for a target is only feasible if the machine can drive away from the previous target $M_j(gp)$ and navigate to the end pose of a task $M_i(gp)$ considering piles created by all the preceding tasks.

Figure 4B:
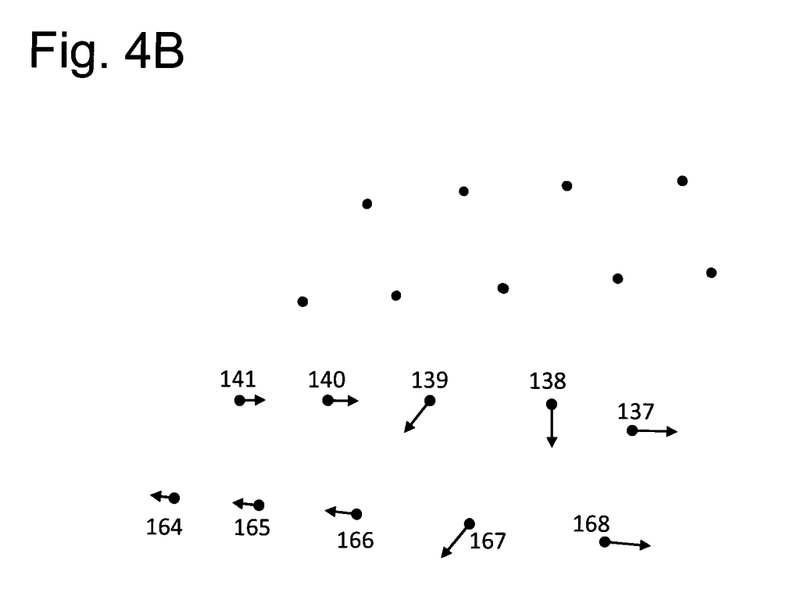
FIG. 4B shows an example of approach angles for drilling for a subset of holes to be drilled.

For example, FIG. 4B shows a selection of one feasible approach angle for some of the tasks discussed with reference to FIG. 4A and hence with respect to existing sequencing constraints. The approach angles are represented by arrows, and the machines drive away from the targets in the opposite direction of the arrows.

The eight possible assignments to the decision variable determine eight different possible end poses of the machine $\{M_i(gp_1), \ldots, M_i(gp_8)\}$, which differ only in the orientation of the machine in the goal pose. A possible assignment $\theta_k$ is validated through a path planner, which is given the triple $(M_i(sp), M_i(gp_k), M_i(m))$, where the start pose is the goal pose of the preceding task $(M_i(sp)=M_j(gp))$, and $M_i(m)$ is a map of the environment that contains obstacles and a geofence. The obstacles correspond to circular shapes centered in the goal poses of the preceding tasks. Through the map $M_i(m)$, the path planner accounts for targets that have already been drilled prior to task $M_i$.

The path planner may be invoked potentially several times while solving the motion planning sub-problem. With regard to the path planner, for example, any suitable path planner can be used, e.g. a path planner for a car-like mobile robot based on cubic spirals. Such path planners are known in the art, and computes paths consisting of curvature-constrained curves constituted by few cubic spirals and straight lines. The output of the path planner is either fail, which indicates that a particular approach angle $\theta_k$ cannot be achieved, or the spline $M_i(P)$, representing a kinematically-feasible and obstacle-free motion from $M_i(sp)$ to $M_i(gp_k)$.

Machine Allocation Sub-Problem

In this sub-problem, a decision variable is a set $M' \subseteq M$ such that $\forall M \in M'$, $M(r)$ has not been decided, and $\exists M_i \in M': M_i$ precedes $M \lor M$ precedes $M_i$.

That is, a total order of tasks has been decided, but machines have not yet been allocated. The values are complete assignments of machines to tasks, i.e., an assignment $M(r)=R$ for each task in $M'$. The machine allocation sub-problem has a huge space of possible solutions. Each possible solution has complex ramifications on other sub-problems: different allocations will affect the amount of coordination necessary; allocations must be such that the final task of a machine is not surrounded by piles (drilled by other machines), which would make it impossible to navigate to its final parking pose.

Heuristics with high pruning (skipping) power can be used to explore the search space of this sub-problem, and these heuristics must account for other sub-problems. For example, the solver can be guided towards solutions where drill targets are assigned in rows as much as possible, e.g. least possible change in direction of the drill rig for as long rows of holes as possible, and where directions can be given regarding preferred orientations of the rows. Such data can be input e.g. by an operator. Heuristics are discussed further below. Solutions to the machine allocation sub-problem are indirectly validated in other sub-problems, hence no particular solver is used for direct validation of possible values.

Temporal Sub-Problem

Figure 4C:
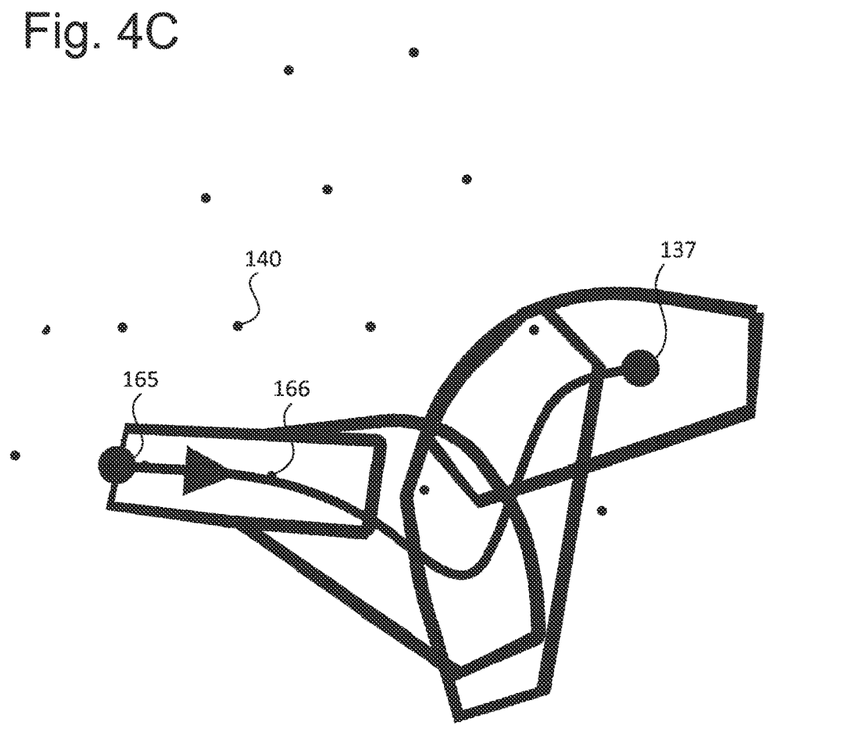
FIG. 4C shows an exemplary motion pattern of a drill rig when moving from a drilled hole to a hole to be drilled.
Figure 4D:
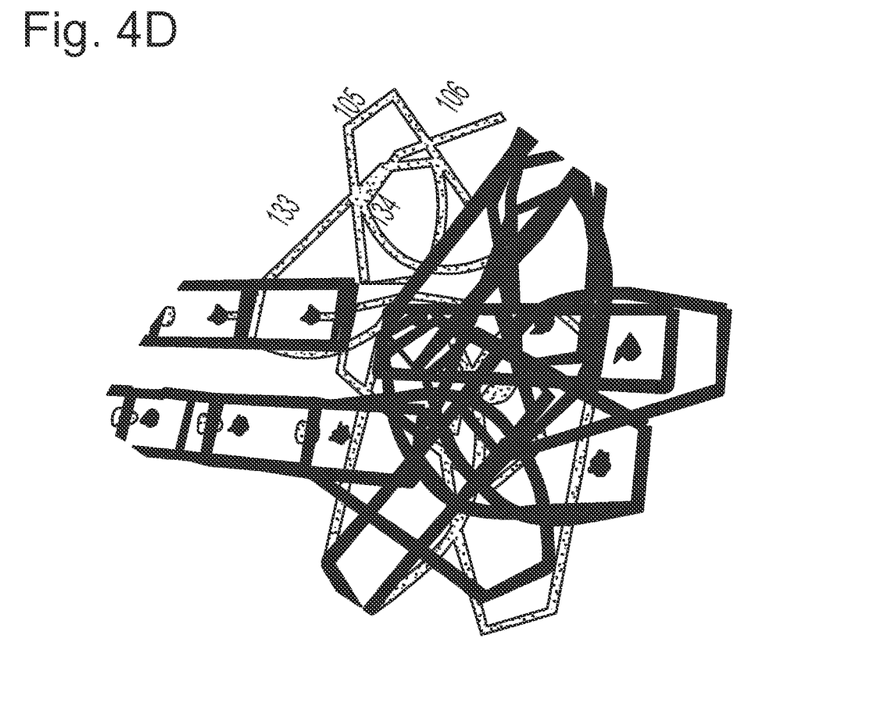
FIG. 4D shows an exemplary motion pattern of a drill rig close to a geofence.

A task's path P is segmented into a sequence of sub-paths based on its curvature. Each segment can e.g. be associated to a convex polygon $s_k$ resulting from the sweep of the machine's footprint along the sub-path. The resulting sequence $\{s_1, \ldots, s_m\}$ of convex polygons represents the areas occupied by a machine while navigating along the path. While navigation along a line of holes can give rise to a very simple movement pattern (straight line), the movement pattern close to the geofence can be considerably more extensive. Problems become much more difficult if they contain drill targets that are close to the geofence, whereas when that is not the case problems are easier, since machines have enough space to maneuver regardless of how approach angles are chosen. This is illustrated in FIG. 4C, which shows polygons representing footprints when moving from 166 of FIG. 4A to 138. Obviously the movement pattern becomes considerably more complex before hole 140 of FIG. 4A has been reached, which according to the example (see FIG. 4B) is the first hole where the machine again is aligned with the row of holes. This is schematically illustrated in FIG. 4D.

Figure 5:
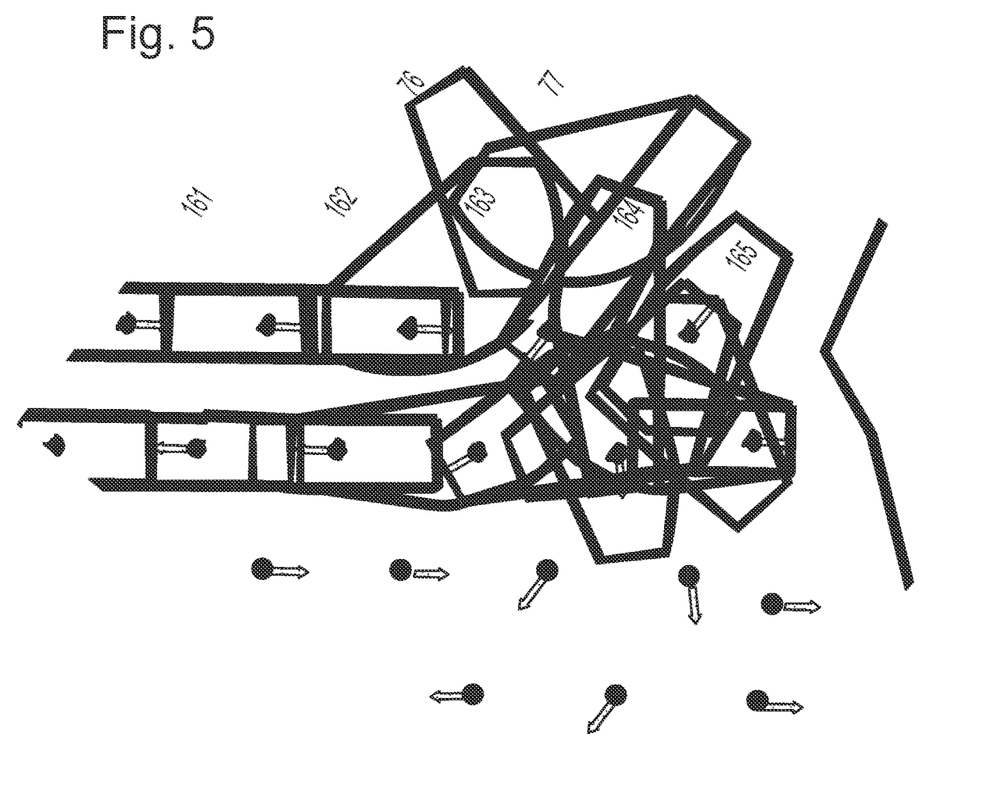
FIG. 5 shows a motion pattern of a drill rig close to a geofence, also illustrating piles of already drilled holes.

Since the path planner that is used to obtain P is aware of the obstacles created by preceding tasks, the convex polygons do not intersect piles resulting from drilling. This is illustrated in FIG. 5, where black circles represent drill piles (the orientation of the drill rig is also when drilling is also indicated by arrows), polygons represent the motions of the machine. As can be seen drill piles are not touched.

In addition to the polygons representing the motion of machines, the activities involved in a task M (i.e., $M(A) = \{drilling, leveling, de\text{-}leveling\}$) have polygons associated to them. Since these activities all occur while the machine is idle in pose $M(gp)$, their polygons, in the present example, since drilling is performed substantially vertical, coincide with the polygon that covers the last sub-path of $M(P)$. Hence, the set of all convex polygons of task M is $M(S) = \{s_1, \ldots, s_m\} \cup \{s_{drilling}, s_{leveling}, s_{de\text{-}leveling}\}$, where $s_{drilling} = s_{leveling} = s_{de\text{-}leveling} = S_m$.

Each convex polygon in $M(S)$ is associated to a time interval in the set $M(T) = \{I_1, \ldots, I_{m+3}\}$. Interval $I_k = [I_s, I_e]$ is a flexible temporal interval within which machine $M(r)$ is in $s_k$, where $I_s = [l_s, u_s]$, $I_e = [l_e, u_e]$, $l_{s/e}, u_{s/e} \in \mathbb{N}$ represent, respectively, an interval of admissibility of the start and end times of the occurrence of polygon $s_k \in S$.

The temporal sub-problem consists of deciding a start and an end time for each interval $I_k$. The temporal sub-problem has a decision variable for every machine $R \in \mathcal{R}$.

Each decision variable is a set of tasks $M' \subseteq M$ such that for all $M_i \in M'$:

(1) $M_i(P)$ has been decided,
(2) $M_i(r)=R$, and
(3) the start and end times of $M_i(T)$ have not been decided.

The problem of deciding valid start/end times of the intervals is reduced to a Simple Temporal Problem (STP). STP:s are well known and various algorithms exist for solving STP:s. The STP can be formulated as a collection of temporal constraints as follows.

First, for each $M_i \in M'$ with intervals $M_i(T) = \{I_1, \ldots, I_{m+3}\}$, temporal constraints that reflect the order of the convex polygons along the path $M_i(P)$ are imposed:

$$I_{k-1} \text{ before } I_k, k \in \{2 \ldots m+3\}. \tag{1}$$

Second, temporal constraints that force the possible start and end times of tasks to adhere to the ordering decided by the sequencing solver are added. That is, for each pair of tasks $(M_i, M_j) \in M' \times M'$ that are subject to a sequencing constraint $M_i$ precedes $M_j$, the following temporal constraint is added among the intervals $M_i(T) = \{I_1^i, \ldots, I_{m+3}^i\}$ and $M_j(T) = \{I_1^j, \ldots, I_{m+3}^j\}$: $I_{m+3}^i$ before $I_1^j$, reflecting the fact that the de-leveling polygon of task $M_i$ occurs before the first motion of task $M_j$. Third, we impose minimum durations of the motions and activities of the machines:

$$\text{Duration}[\alpha, \infty) I_k, k \in \{1 \ldots m+3\}. \tag{3}$$

For every motion polygon $s_k$, $k \in \{1, \ldots, m\}$, an initial value for $\alpha$ is computed based on the maximum allowed velocity of machine R. Hence, the earliest time solution of the STP represents the fastest possible execution of all motions and activities in the plan, i.e., an "optimistic" estimate of the start and end times of all operations of all machines.

During execution, further temporal constraints can be added to reflect contingencies such as machine maintenance, delays, and so on. The association of an interval per polygon allows predication via temporal constraints how long every movement or activity will take. Solving the STP is polynomial in the number of intervals in the temporal problem, namely $\Sigma_{M_i \in M'} |M_i(T)|$.

Note that there are no temporal constraints among intervals pertaining to different machines, the motions and activities of different machines may be concurrent.

Coordination Sub-Problem

Since a plurality machines operate in the same environment, it is crucial to address collision/deadlock avoidance. As a consequence of decisions made in all previous sub-problems, the common constraint network includes polygons, temporal intervals, and temporal constraints (eqs. (1) to (3)) among them. The STP solver computes start and end times for each interval. This determines when machines will occupy motion and activity polygons in the various tasks. If two polygons pertaining to different vehicles overlap, and their corresponding temporal intervals intersect, then the two vehicles may collide. Coordination avoids this by imposing additional constraints that eliminate temporal intersection where needed.

Decision variables of the coordination sub-problem are pairs of polygons and intervals represented by quadruple $(s_k^i, s_m^j, I_k^i, I_m^j)$, of tasks i and j respectively, that overlap both spatially and temporally, i.e., $s_k^i \cap s_m^j \neq \emptyset \wedge I_k^i \cap I_m^j \neq \emptyset \wedge M_i(R) \neq M_j(R)$. The value of a decision variable is one of two possible constraints $\{I_k^i$ before $I_m^j, I_m^j$ before $I_k^i\}$, imposing either of which eliminates the temporal overlap between concurrent polygons. The STP solver will validate the sequencing in time of these two overlapping polygons accordingly. It will also compute the consequent shift in the occurrence of any other polygon whose interval is constrained with $I_m^j$ or $I_k^i$ by means of temporal constraint propagation within the common constraint network.

Figure 7:
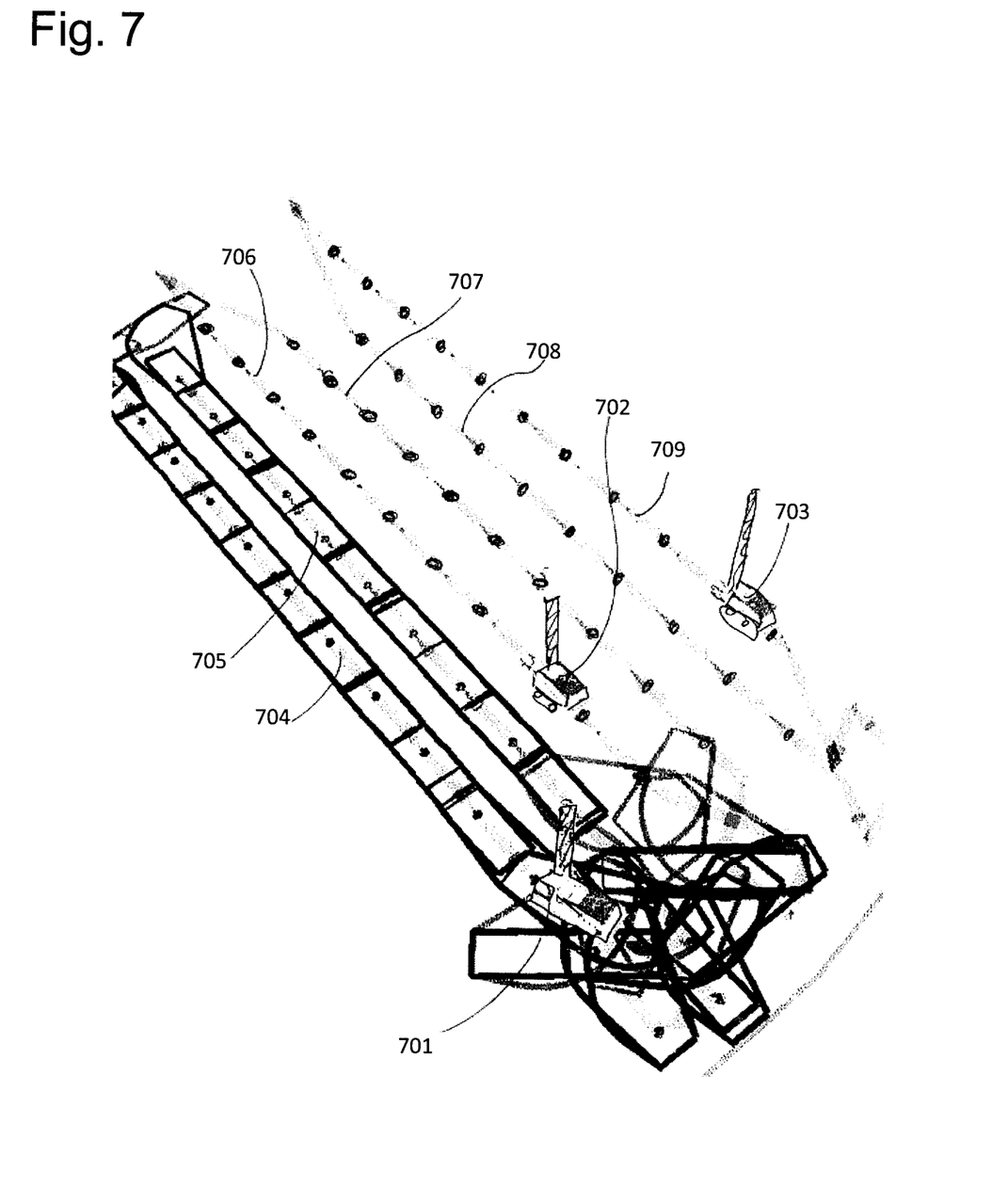
FIG. 7 shows an example of scheduling of work of three machines to avoid collisions.

The polygons involved in the decision variables represent two types of occupancy. The first type corresponds to the motions of machines as described above. The second corresponds to the piles created by drilling. By modeling both types of polygons in the common constraint network, collisions among machines and with piles are found and thus scheduled. This is exemplified in FIG. 7, where there machines 701, 702, 703 each drills two rows of holes 704-705, 706-707, and 708-709, respectively. As can be seen from FIG. 7, motions of machine 701 partly occupy rows 706 and 707 for maneuvering between rows 704 and 705. This results in machine 702 having to wait just before the conflicting area, until machine 701 finishes its maneuver. According to the disclosed example, machine 702 will occupy some part of rows 708, 709, and hence machine 703 will have to wait until machines 701, 702 are finished switching rows. The motion planner can ensure that the motions of machine 702 do not conflict with rows 704 and 705 and hence do not disturb already drilled holes of these rows is handled by the motion planner. This also applies for machine 703 and rows 706, 707. As machines start their execution concurrently, their motions would lead to collisions, were it not for the fact that the coordination sub-problem was solved as well. The temporal constraints can force machines 702 and 703 to yield when necessary.

Backtracking Search

The collection of decision variables for each sub-problem mentioned above constitutes the high-level CSP (henceforth called meta-CSP). Search in the meta-CSP consists in finding an assignment of values to decision variables that represent high-level requirements. Each of these requirements is, in this case, a sub-problem. Possible values among which these assignments are selected are verified by a specific solver for each sub-problem. Thanks to the common representation of the search space, each sub-problem solver accounts for the assignments made for decision variables of other sub-problems. For example, the path planner validates with respect to a map containing obstacles resulting from sequencing decisions; and the coordinator's decisions depend on the machine allocation as well as motion plans.

The choices of values for decision variables in the various sub-problems contribute parts of the tasks in the common representation, and the sub-problem solvers propagate the consequence of these decisions. The sub-problem solvers used in the present approach are denoted in the following with solve-p, where $p \in \{seq, alloc, time, coord, mp\}$.

As has been explained, solve-seq disallows sequencing decisions that are not totally ordered; solve-mp verifies by means of a motion planner that motions are kinematically feasible and obstacle-free; solve-alloc accepts all candidate allocations, as the infeasible ones are discovered indirectly via coordination; solve-time is a STP solver which computes feasible start/end times of task intervals subject to temporal constraints; solve-coord is also provided by the same STP solver, which validates and computes the consequences of temporal ordering decisions.

A CSP-style heuristically guided backtracking search can be used to find values to assign to the decision variables. As is well known, backtracking algorithms are frequently used in solving CSP problems. Henceforth, let the set of sub-problems be indicated by

---

Function DP³-solver ($\mathcal{M}$): success or failure

1 $D_{seq} \cup D_{alloc} \cup D_{time} \cup D_{coord} \cup D_{mp} \leftarrow$ CollectDVars ($\mathcal{M}$)
2 if $\exists D_i \neq \emptyset$, $i \in \{seq, alloc, time, coord, mp\}$ then
3 | p ← Choose ({seq, alloc, time, coord, mp}, $h_{prob}$)
4 | d ← Choose ($D_p$, $h_i^{var}$)
5 | $V_d$ ← CollectValues (d)
6 | while $V_d \neq \emptyset$ do
7 | | v ← Choose ($V_d$, $h_i^{val}$)
8 | | Update ($\mathcal{M}$, v)
9 | | if Solve-p($\mathcal{M}$) then
10 | | ⌊ return DP³-solver ($\mathcal{M}$)
11 | | Remove ($\mathcal{M}$, v)
12 | ⌊ $V_d \leftarrow V_d \setminus v$
13 ⌊ return failure
14 return success

---

Given the set of tasks M, Algorithm DP3-solver collects all the decision variables belonging to all the sub-problems (line 1), and terminates when no decision variables are left (lines 2 and 14). A particular sub-problem is then chosen according to a sub-problem ranking heuristic $h_{prob}$ (line 3), e.g., $h_{prob}$ prioritizes machine allocation decision variables over coordination decision variables, as the latter problem requires machines to be assigned to tasks (see above). Among the decision variables of a sub-problem, one is chosen according to a variable ordering heuristic $h_i^{var}$ (line 4). For example, which target should be selected first among the decision variables $D_{mp}$ of the motion planning sub-problem. Among possible alternative values, one is chosen according to value ordering heuristic $h_i^{val}$ (lines 5-7). For instance, which approach angle has to be selected for a given target in the motion planning sub-problem. This value is added to the common representation (line 8). The sub-problem solver solve-p verifies that the assignment v is feasible. If so, DP3-solver is called recursively (line 10), which results in selecting another unassigned variable subject to the newly updated common representation M. Note that if all possible values are attempted for a decision variable d and all are rejected by solve-p, the algorithm returns failure (lines 6, 11-13). The problem-, variable- and value-ordering heuristics used in the DP3-solver are explained in the following.

Heuristics

The DP3-solver must select a set of decision variables pertaining to a sub-problem from the union of all decision variables. This selection can be guided by a heuristic $h_{prob}$ to improve computational efficiency. Let $D_i \prec D_j$ indicate that the decision variables of problem i have a higher priority than those of problem j. The partial ordering based on which the $h_{prob}$ heuristic operates is $\{D_{seq} \prec D_{aloc} \prec D_{tp} \prec D_{coord}, D_{mp} \prec D_{aloc} \prec D_{tp} \prec D_{coord}\}$. Decision variables to branch on (within a chosen $D_i$) are ordered based on $h_{var}$, and alternative values are chosen according to $h_{val}$. Variable ordering heuristics are provided for the sequencing sub-problem and for the coordination sub-problem. The latter heuristic is based on temporal flexibility and has been used in the prior art for resource-constrained project scheduling. The former is based on an analysis of the drill target placements, and is described below.

Variable Ordering for Sequencing $h_{seq}^{var}$.

The pattern of drill targets is analyzed to reveal its topology and the possible principal directions of drill target sequencing. For other kinds of mining tasks to be performed, similar analysis can be performed. To determine the former, a distance threshold is used; the latter are discovered via a K-Means which is a heuristic algorithm used to cluster the set of angular coefficients of topologically neighboring drill targets. This yields clusters containing similarly oriented edges of the topology. These are used to group drill targets into roughly-parallel lines. The topology and the groupings are used to rank drill targets in groups. Variable in these groups are first in the sequencing sub-problems.

Value ordering heuristics are defined for the sequencing, allocation, motion planning, and coordination sub-problems. As for variable ordering, the decision variables in the coordination sub-problem are branched upon using a heuristic based on temporal flexibility that is widely used in the scheduling literature. The remaining heuristics $h_{seq}^{val}$, $h_{alloc}^{val}$ are explained below.

Value Ordering for Sequencing $h_{seq}^{val}$.

A value for a decision variable of the sequencing sub-problem decides which drill target precedes a given target. There are many alternatives for this choice. Note that sequencing decision variables that are resolved first are those pertaining to drill targets along groups—for such decision variables, the heuristic prioritizes one of two possible predecessors, namely those adjacent to the current decision variable in the grouping.

For example, the two values with highest heuristic score for decision variable $M_{140}$ in FIG. 4A are $M_{141}$ precedes $M_{140}$ and $M_{139}$ precedes $M_{140}$.

Figure 6:
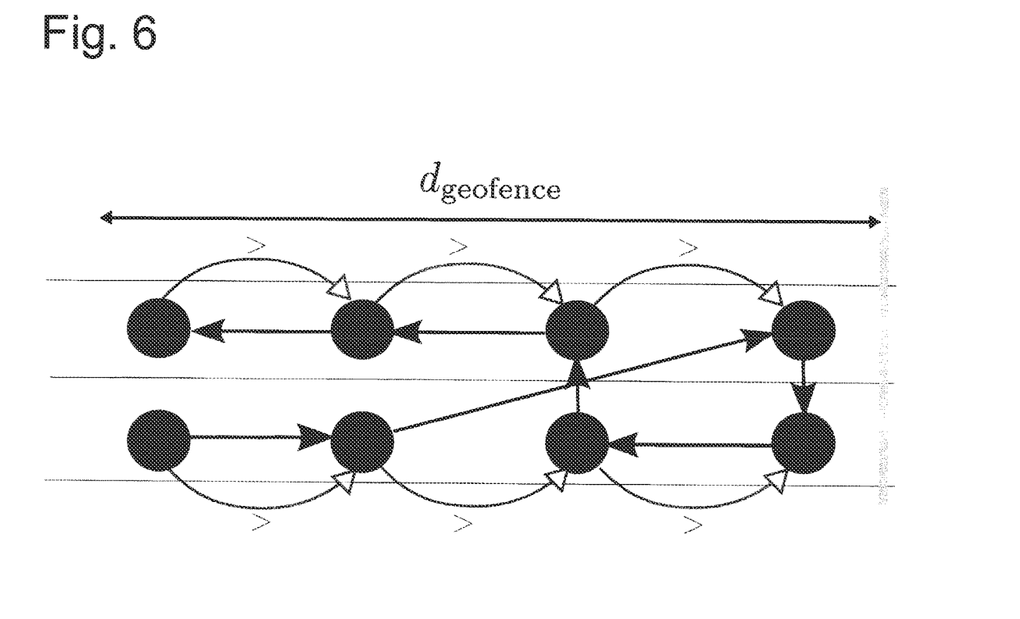
FIG. 6 shows a suggested sequence pattern for use when sequencing tasks near geofences.

Also, this heuristic contributes to alleviating the computational burden of finding sequences in regions close to the geofence while transitioning between groups. Finding a feasible sequence in these situations is challenging because a machine has limited space to maneuver. These regions of highly-constrained motion span typically eight targets for every pair of adjacent groups, thus in the worst case sequencing requires verifying, through motion planning, $8^7$ possible motions for each pair. For this reason, the heuristic may use given sequence patterns that reflect common practice by human operators. A sequence pattern is a topological description of a human driving behavior, augmented with metric information that facilitates assessing whether the pattern is applicable in a given region. Specifically, a sequence pattern is a graph (V,E) where V is a set of nodes representing drill targets, and E is a sequence of precedence constraints among the nodes. A distance threshold $d_{geofence}$ is also given, and represents the minimum distance to the geofence required for the pattern to hold. Also, a ranking < of the nodes in terms of how far they lie from the geofence may be provided. An example pattern that can be used by the solver is shown in FIG. 6. If the search is considering a decision variable $M_i$ that is surrounded by targets that can be mapped to the nodes in the pattern, then the heuristic ranks possible predecessors of $M_i$ according to the edges in E. Suitable patterns can be defined and used by the solver to improve computational efficiency.

Value Ordering for Motion Planning $h_{mp}^{val}$.

This heuristic may e.g. suggest approach angles for a target that is similar to those assigned to other drill targets in a same group.

Value Ordering for Machine Allocation $h_{alloc}^{val}$.

A solution to the machine allocation sub-problem determines which drill target is drilled by which machine. Among all possible choices, those may be preferred which have three properties: (1) each machine is assigned to a contiguous sequence; (2) start and end tasks of a contiguous sequences are the drill targets close to an open area, i.e., not close to a geofence and not those that are entirely surrounded by other drill targets; and (3) targets are evenly distributed among machines or according to machine capacity when machines of different capacity are used. This heuristic not only contributes to the plan quality in terms of similarity to what a human planner would decide, but also improves the efficiency in planning time by suggesting a restriction on start and exit points for each machine.

The use of heuristics e.g. according to the above may substantially improve computational efficiency when seeking a solution to the problem of assigning the tasks to the machines.

Adapting Solutions During Operation

Several aspects of the overall problem of assigning tasks become known only online. Therefore it may be necessary to compute at least parts of the solution to the overall problem during execution, i.e. during drilling according the present example, and/or to adapt existing plans to contingencies.

For example, the actual durations of activities only become apparent during execution. In a bench, various types of contingencies may occur, such as unexpected maintenance of machines, or increased drilling time due to unknown geological characteristics of the terrain. Therefore, it may be required to monitor the execution of the tasks and reflect the contingencies in the common representation. According to the present example, the nominal behavior of the machines is given by a solution of the DP3, obtained via Algorithm above.

The start and end times associated to the intervals M(T) of every task M are computed through temporal propagation. All the lower bounds represent the earliest possible times at which tasks can be executed, and are used to compute the desired speeds at which the computed paths should be driven by the vehicle executives. The control unit 206 controls the machine to follow the given trajectories. It also reports current progress of the machine. Deviations are used as constraints by the STP solver to propagate any mismatch between prescribed and executed tasks of all machines being used. The STP solver plays a central role in execution monitoring. The common representation of the tasks can be updated e.g. at a frequency of 1 Hz to continuously account for deviations. A task in ended by adding a temporal constraint into the common constraint network representing the finish time of the task as the executive layer informs. The consequences of such updates can be easily computed within the period of one second because the STP solver performs polynomial inference. Also, due to the fact that adding constraints cannot "undo" other decisions, unforeseen durations (e.g., encountering hard rock while drilling) can be accounted for at execution time.

More precisely, the prolongation of an activity represented by a flexible time interval associated to a motion polygon will not affect the sequencing, the approach angle, the particular motions, nor machine allocations. It only bears consequences on the coordination sub-problem, as delays may need to be propagated to other waiting machines.

According to one embodiment, e.g. if it is crucial to minimize the Time To Completion TTC, prolongation of an activity may be allowed lead to the re-allocation of the machines, which in turn would result in updating the decisions in the sequencing sub-problems. This allows for re-balancing the workload among the machines.

The feedback of progress data may also be utilized when only one machine is operating, also when the machine is manually operated, since this still will facilitate planning of further work in the mine. Also, rearrangement of tasks may be required also in this case, e.g. if another machine is taken into operation.

On-line temporal reasoning also caters to another important requirement of mining companies, namely the need to know an estimate of the Time to Completion (TTC) in order to plan following events and/or resource usage. At planning time, an optimistic TTC can be calculated by initializing the duration constraints with reasonable values: the durations of intervals corresponding to motion polygons are computed using the maximum allowed speed of machines; and the intervals corresponding to activity polygons are initialized with durations under nominal conditions (average rock density, and no maintenance). As execution proceeds, TTC is updated as a result of temporal reasoning to reflect the actual situation, which facilitates planning of other activities in the mine.

The time of completion, i.e. the point of time at which the tasks are expected to be carried out can be displayed and updated e.g. to an operator. Alternatively or in addition, a time to completion can be displayed, i.e. the time remaining to complete the tasks.

According to the invention, the overall problem is divided into a plurality of sub-problems and the mutually feasible solutions to the individual sub-problems are found.

The DP3-solver combines solutions from different sub-problems, each of which can be seen as a "classical" robotics problem. A given hybrid problem is broken down and interdependencies among sub-problems are identified. A heuristically guided backtracking search can be used to find a solution to the overall problem in the joint search spaces of the sub-problems.

Furthermore, a plurality of solutions to the overall problem of assigning tasks and/or one or more sub-problems can be found. In such situations a solution can be selected on the basis of a cost function, where the cost function can take any suitable parameter into account. For example, the cost function can constitute minimization of a time to completion of said set of tasks.

The invention has so far been described in connection to a surface mine. The invention, however, is suitable for any mining application where a plurality of movable machines can be employed to autonomously perform tasks, such as e.g. collection of ore from one location to another, e.g. in underground mines.

Consequently, the invention is not limited other than in regard of what is stated in the appended claims.

The invention claimed is:

1. Method for assigning a set of tasks to a plurality of mining and/or construction machines, said plurality of mining and/or construction machines being arranged to be driven between positions for performing tasks, characterized in that the method includes:
    defining, via a processor, a first set of constraints to be fulfilled when assigning said tasks to said plurality of mining and/or construction machines;
    by means of a solver algorithm, executed by the processor, finding an overall solution fulfilling said first set of constraints by solving each constraint as a sub-problem, a solution to at least one sub-problem being dependent on the solution of at least one other sub-problem;
    one of said sub-problems being a coordination sub-problem scheduling machines such that when said plurality of mining and/or construction machines are operating in overlapping portions of said geographical area, times for performing said tasks are assigned such that said plurality of mining and/or construction machines will not collide,
    utilizing, by the processor, a common representation of said sub-problems, where said tasks are represented by variables, so that solver algorithms of the sub-problems, respectively, share a common search space when searching a solution to a sub-problem,
    said overall solution fulfilling said first set of constraints being an overall solution where a solution to a first of said sub-problems is validated by solutions of others of said sub-problems,
    assigning the set of tasks, by the processor, to said plurality of mining and/or construction machines according to the determined validated overall solution, wherein tasks of said set of tasks are arranged to be carried out at least partially overlapping in time by said plurality of mining and/or construction machines, wherein at least one task in the set of tasks is drilling, and
    performing, via the plurality of mining and/or construction machines, the set of tasks, such that at least the drilling is performed.

2. Method according to claim 1, further including:
    validating a solution to said first sub-problem by determining that said solution to said first sub-problem allows a solution of other sub-problems being dependent on the solution to said first sub-problem.

3. Method according to claim 1, further including:
    assigning priorities to said sub-problems, and determining a solution to the assigning of said tasks by validating a solution to a higher prioritized sub-problem by solutions to lower prioritized solutions.

4. Method according to claim 1, wherein a solution to said first sub-problem is discarded when solutions to other sub-problems validating the first sub-problem cannot be found.

5. Method according to claim 1, further including:
discarding solutions to said first sub-problem when said solutions to said first sub-problem is not validated by solution to all sub-problems being dependent on the solution to the first sub-problem.

6. Method according to claim 1, wherein solving of at least one of said sub-problems require an already present solution of at least one other of said sub-problems.

7. Method according to claim 1, further including:
solving said problem of assigning said tasks using a representation of the tasks to be carried out by means of said plurality of mining and/or construction machines, and a representation of said plurality of mining and/or construction machines.

8. Method according to claim 1, wherein said tasks are arranged to be carried out within a confined geographical area.

9. Method according to claim 8, said plurality of mining and/or construction machines being allowed to move within overlapping portions of said geographical area.

10. Method according to claim 1, further including:
assigning a first subset of said set of tasks to a first machine, and a second subset of tasks of said set of tasks to a second machine.

11. Method according to claim 1, wherein, when a first subset of said set of tasks has been assigned to a first machine and a task of said subset has been completed by said machine:
the carrying out of a following task of said subset of tasks by said first machine requires autonomous movement of said first machine from a first location to a second location in said geographical area.

12. Method according to claim 1, wherein:
one of said sub-problems consists of determining a sequence of execution of said tasks to be assigned to said plurality of mining and/or construction machines such that each of said tasks is sequenced with respect to the others of said tasks.

13. Method according to claim 12, said sub-problem of determining an order of execution of said tasks being said first sub-problem to be solved among said sub-problems.

14. Method according to claim 1, further including:
determining a start time and an end time for performing each of said tasks, start time and end time of a task being defined in relation to start times and end times of the others of said tasks, and said assignment of said tasks including a start time and end time for performing said tasks, respectively.

15. Method according to claim 14, further including:
receiving progress data regarding progress of fulfillment of said tasks from said plurality of mining and/or construction machines, and recalculating said start times and end times for tasks remaining to be carried out on the basis of received progress data.

16. Method according to claim 1, further including:
determining an estimated time of completion and/or time to completion of said tasks, and displaying said estimated time of completion and/or time to completion.

17. Method according to claim 15, further including:
updating said estimated time of completion and/or time to completion of said tasks on the basis of progress data received from said plurality of mining and/or construction machines when carrying out said tasks.

18. Method according to claim 1, further including, when performing said tasks, said plurality of mining and/or construction machines communicating progress regarding fulfillment of said tasks, and re-solving the assignment of tasks to said plurality of mining and/or construction machines when data from said plurality of mining and/or construction machines indicate a requirement of re-assignment of said tasks.

19. Method according to claim 1, further including, when solving said problem of assigning tasks to said plurality of mining and/or construction machines:
determine the assigning of said tasks such that, when said machine has finished assigned tasks, a defined end position can be reached by a machine without violating allowed movements within the area in which said tasks are being carried out.

20. Method according to claim 1, wherein each of said sub-problems are solved by means of a sub-problem specific solver.

21. Method according to claim 1, further including:
assigning tasks to said plurality of mining and/or construction machines only if a solution to said first sub-problem is validated.

22. Method according to claim 1, further including, when tasks have been assigned to a machine:
communicating said tasks to said machine.

23. Method according to claim 1, further including, when a plurality of solutions to the assignment of tasks and/or a sub-problem is found, selecting solution on the basis of a cost function.

24. Methods according to claim 23, where the cost function is a time to completion of said set of tasks.

25. Method according to claim 1, further including:
mining, via a second mining machine in the plurality of mining and/or construction machines, to carry out a task in said tasks assigned to said plurality of mining and/or construction machines.

26. System for assigning a set of tasks to a plurality of mining and/or construction machines, said machines being arranged to be driven between positions for performing tasks, characterized in that the system includes:
said plurality of mining and/or construction machines;
a computer system configured to execute operations comprising:
receiving, via a receiver, a first set of constraints to be fulfilled when assigning said tasks to said plurality of mining and/or construction machines;
finding, via a solver algorithm of the computer system, an overall solution fulfilling said first set of constraints by solving each constraint as a sub-problem, a solution to at least one sub-problem being dependent on the solution of at least one other sub-problem,
one of said sub-problems being a coordination sub-problem scheduling machines within said plurality of mining and/or construction machines such that when said plurality of mining and/or construction machines are operating in overlapping portions of said geographical area, times for performing said tasks are assigned such that said plurality of mining and/or construction machines will not collide,
the solver utilizing a common representation of said sub-problems, where said tasks are represented by variables, so that solver algorithms of the sub-problems, respectively, share a common search space when searching a solution to a sub-problem,
said overall solution fulfilling said first set of constraints being an overall solution where a first of said sub-problems is validated by solutions of the others of said sub-problems, and assigning tasks, via an assignor of the computer system, to said plurality of mining and/or construction machines according to the determined validated overall solution, wherein tasks of said set of tasks are arranged to be carried out at least partially overlapping in time by said plurality of mining and/or construction machines, wherein at least one task in the set of tasks is drilling, wherein said plurality of mining and/or construction machines perform the set of tasks, such that at least the drilling is performed.

27. Mining and/or construction machine, characterized in that it comprises a system according to claim 26.

* * * * *